3,269,889
ASBESTOS PAPER CONTAINING CARBON AND
METHOD OF MAKING IT
Marsden C. Hutchins, Bound Brook, N.J., assignor to Johns-Manville Corporation, New York, N.Y., a corporation of New York
No Drawing. Filed Jan. 2, 1963, Ser. No. 248,864
20 Claims. (Cl. 162—155)

This invention relates to a novel paper product and more particularly to an asbestos sheet or web such as paper and millboard which contains throughout major proportions of particulate carbonate, and means of producing the same.

The primary object of this invention is to produce a high bulk density asbestos paper of good strength properties which embodies up to approximately 75% by weight thereof of particulate carbon.

It is also an object of this invention to provide an asbestos paper of a composition or comprising constituents which entrain and retain high concentrations or proportions of carbon particles while retaining sufficient porosity and ample web strength to permit drainage and normal sheet formation with a conventional paper manufacturing machine and process.

It is a further object of this invention to provide a paper composition which can retain up to about 75% by weight thereof of carbon filler while at the same time maintain sufficient strength and porosity to be handleable and workable in conventional continuous saturation processes employing resin bath submersion techniques followed by tower drying and curing, and to thereby take up and hold appreciable amounts of higher molecular weight resin saturants.

It is a still further object of this invention to provide means of producing a carbon containing paper which effects nearly a 100% retention of very high proportions of carbon filler with normal water-laid sheet forming or manufacturing techniques and apparatus.

These and other objects and advantages of this invention become more apparent and fully understood from the hereinafter detailed description.

The means and product of this invention in general comprises a flexible sheet of asbestos such as a paper or millboard product which is composed of a combination of specific class of asbestos fiber and synthetic resin size along with the particulate carbon filler.

For the effective practice of this invention the asbestos component is derived from chrysotile, crocidolite and amosite types of fiber which are commonly characterized as "harsh" and typically consist of asbestos fibers having a surface area of about 10,000 to 12,000 cm.²/gram. Fibers of this category are refined or beaten until substantially free of any unopened bundles, clumps or pencils of about 1/32 inch or more in diameter which in turn extends their surface area, or in other words to the point of possessing a Schopper-Riegler freeness test value of at least 180 and preferably of approximately 350 to 560 ml. Further, for optimum effects the asbestos fiber should be sized at least 70% by weight thereof retained on 200 mesh standard screen sieve with at least about 50% by weight of said fiber retained on 200 mesh standard screen sieve passing 28 mesh standard screen sieve and retained on 100 mesh standard screen sieve, based upon a standard Bauer-McNett test.

The size comprises acrylic resins, urea formaldehyde resins, melamine formaldehyde resins, and synthetic resins of like characteristics as for example polyvinyl acetate, polyvinyl chloride, but preferably acrylic resins such as Rohm & Haas Co.'s Rhoplex WC–9 or H–16. These resins may be obtained and employed in liquid, solid particulate or emulsion form and most conveniently applied in an aqueous emulsion which is readily dispersible with the fiber in a paper beater or the like apt mixing means.

Paper maker's alum—aluminate sulfate—as is usual, aids in coagulating the solids of the slurry or suspension of stock facilitating the web or sheet formation and as such comprises a typically desirable component. Moreover, with some resin compositions such as urea formaldehyde, alum facilitates their retention and cure.

The carbon filler may consist of any particulate or powdered carbon including carbon fiber, flakes, or other forms of powdered carbon materials, and particularly the graphite form of carbon. The flaked or powdered materials are usually sized less than about 200 mesh and more expediently less than 300 mesh standard screen sieve. When the carbon particles are of fibrous form, the quality or nature of the asbestos fiber is of diminishing significance.

Additionally, small quantities as for example about 1–3% by weight of agents such as urea formaldehyde or melamine formaldehyde resins, carboxymethyl cellulose, starch, vinyl alcohol and the like may be included in the stock to enhance the hot wet strength of the product. Moreover, fibrous materials other than asbestos and carbon can be employed to advantage to impart greater strength and/or with inferior categories of asbestos. These include nylon (polyamide resin) and other synthetic fibers, natural fibers such as cotton linter or wood fiber, and inorganic fibers.

It has been found that an aqueous slurry or suspension of a paper stock comprising a combination of materials or components of the foregoing characteristics in the effective ratios of: approximately 15 to 60%, and preferably about 20 to 50% by weight of the particular asbestos fiber; approximately 2 to 10%, and preferably about 3 to 6% by weight of resin size; approximately 0 to 3%, and normally about 1% by weight of alum, and approximately 35 to 80%, and preferably about 60 to 75% by weight of particulate carbon filler, can be formed or integrated into a porous and strong web or sheet pursuant to typical paper manufacturing processes or techniques employing conventional apparatus such as a Fourdrinier or cylinder paper machine with a substantially 100% carbon filler take-up and retention. The combined or concerted effects of these specific components or materials of the like given essential properties and ratios entrain the carbon filler in significantly high or major proportions and integrate the ingredients of the slurry into a coherent, strong and porous web or sheet which is well adapted to normal handling in typical manufacturing processes and resin sizing procedures providing a paper product of unique over-all composition and properties.

The following comprises specific illustrations or examples of preferred and typical highly carbon filled asbestos paper compositions and the means or method of this invention, demonstrating the pronounced properties or results thereof. It should be understood that the specific materials and/or their proportions given, and the paper forming techniques or processes referred to, are merely exemplary and not to be construed as limiting the invention to any particular data recited hereafter.

EXAMPLE I

A high graphite content asbestos paper was produced from a stock of:

| Constituents | Parts Dry by Weight | Parts Wet by Weight | Batch, Pounds |
|---|---|---|---|
| Chrysotile asbestos, grade 4A | 21 | 21 | 168 |
| Powdered flake graphite (Type 40, No. 4874 Charles Pettenos, Inc.) | 75 | 75 | 600 |
| Acrylic resin emulsion, 40% solids (Rhoplex WC-9, Rohm & Haas Co.) | 3 | 7.5 | [1] 24 |
| Paper maker's alum, 10% solution | 1 | 10 | 8 |
| Water | | 1,543.5 | 13,300 |
| Total | 100 | 1,657.0 | 14,000 |

[1] Dry.

The asbestos fiber, having a surface area of 10,000 to 12,000 cm.$^2$/gram was added to a beater and beaten until substantially free of unopened fiber bundles and thereby rendered to a Schopper-Riegler freeness of 330 ml., the carbon graphite added and mixed for 10 minutes, followed by the addition of the acrylic resin and a 5 minute mix, and finally the alum added. Upon completing the admixing of the components the slurry was diluted and a water-laid felt or sheet thereof formed on a Fourdrinier machine. From this paper two samples were extensively examined, giving the following physical properties:

Table I

| Physical Properties | Sample A | Sample B |
|---|---|---|
| Basis weight, lb./100 ft.$^2$ | 8.6 | 10.3 |
| Caliper, mils | 25 | 29 |
| Bulk, percent | 0.29 | 0.28 |
| Mullen, p.s.i. | 5 | 8 |
| Tensile, lb./in. MD | 4.2 | 6.8 |
| Tensile, lb./in. CD | 3.3 | 5.3 |
| Stretch, percent MD | 1.7 | 2.3 |
| Stretch, percent CD | 1.9 | 3.0 |
| Wet (water) tensile lb./in. MD | 1.6 | 2.0 |
| Wet (methylethyl ketone) tensile lb./in. MD | 1.3 | 1.7 |
| Tear, grams MD | 24 | 30 |
| Tear, grams CD | 25 | 32 |
| Stiffness, grams MD | 1.8 | 3.2 |
| Stiffness, grams CD | 1.6 | 2.7 |
| Densometer, sec./100 cc | 46 | 73 |
| Kerosene value, percent | 78 | 74 |
| Asbestos by ash test, percent | 20.7 | 20.5 |

MD denotes machine direction or parallel to the web formation, and CD denotes cross machine direction or perpendicular to web formation The asbestos content of the paper as determined by ash tests, i.e., 20.7 and 20.5% by weight thereof, in relation to the initial amount of asbestos fiber in the stock or furnish—21% by weight—demonstrates the high retention and content of the graphite filler achieved through the means of the specified components of the slurry and in turn paper product.

EXAMPLE II

A number of sets of paper sheets were formed with varying proportions, sources and types of carbon materials with the balance comprising harsh chrysotile asbestos, grade 4A, beaten to a Schopper-Riegler freeness of about 400 ml., in combination with 3% by weight of acrylic resin emulsion, and 1% by weight of alum. The amount, type and source of the carbon fillers employed in these papers and their resulting physical properties were as follows:

Table II

| Samples | A | B | C | D | E | F | G | H | I | J | K | L | M |
|---|---|---|---|---|---|---|---|---|---|---|---|---|---|
| Furnish, percent: | | | | | | | | | | | | | |
| Asbestos fiber | 48 | 68 | 48.5 | 68 | 46 | 21 | 46 | 21 | 46 | 21 | 46 | 21 | 46 |
| Graphite textile fiber (WA-.0007, National Carbon Co.) | 48 | 28 | | | | | | | | | | | |
| ¼ in. Chopped graphite thread (WFA, National Carbon Co.) | | | | | | | 50 | 75 | | | | | |
| Powdered graphite flake (Type 40, No. 4874 Charles Pettenos, Inc.) | | | 48.5 | 29 | 50 | 75 | | | | | | | |
| Carbon filler (Type 163, Keystone) | | | | | | | | | 50 | 75 | | | |
| Chopped carbon thread, ⅛ to ½ in. (H. I. Thompson Co.) | | | | | | | | | | | 50 | 75 | |
| Carbon pigment paste (Aquablack B, Columbia Carbon Co.) | | | | | | | | | | | | | 50 |
| Acrylic resin | 3 | 3 | 3 | 3 | 3 | 3 | 3 | 3 | 3 | 3 | 3 | 3 | 3 |
| Alum | 1 | 1 | | | 1 | 1 | 1 | 1 | 1 | 1 | 1 | 1 | 1 |
| Physical Properties: | | | | | | | | | | | | | |
| Basis weight, lb./100 ft.$^2$ | 3.2 | 3.3 | 3.1 | 3.3 | 3.2 | 3.0 | 3.5 | 3.0 | 3.1 | 2.7 | 3.2 | 3.5 | 3.4 |
| Caliper, mils | 15 | 15 | 12 | 13 | 13 | 9 | 22.5 | 27 | 15 | 10 | 20 | 32 | 15 |
| Bulk, percent | 0.47 | 0.45 | 0.39 | 0.41 | 0.41 | 0.30 | 0.65 | 0.89 | 0.49 | 0.37 | 0.63 | 0.92 | 0.44 |
| Mullen, p.s.i. | 4 | 4 | 4 | 3 | 4 | 3 | 2 | 1 | 4 | 3 | 4 | 2 | 7 |
| Tensile, lb./in. | 5.2 | 5.5 | 5.4 | 4.6 | 3.9 | 1.9 | 3.9 | 2.6 | 4.1 | 2.8 | 4.2 | 2.8 | 7.8 |
| Stretch, percent | 0.8 | 0.8 | 0.6 | 0.4 | 2.0 | 2.5 | 0.6 | 0.5 | 1.8 | 2.9 | 1.1 | 0.6 | 0.7 |
| Wet (water) tensile, lb./in. | 2.7 | 2.7 | 2.1 | 1.4 | 1.5 | 1.1 | 1.1 | 1.3 | 1.7 | 0.8 | 1.2 | 1.7 | 2.7 |
| Wet (methylethyl ketone) tensile, lb./in. | 1.9 | 2.1 | 1.7 | 1.7 | 1.5 | 0.7 | 1.2 | 0.4 | 1.3 | 1.5 | 0.8 | 0.7 | 4.5 |
| Tear, grams | 32 | 36 | 31 | 31 | 23 | 34 | 45 | 38 | 24 | 34 | 38 | 40 | 20 |
| Stiffness, grams | 1.1 | 1.0 | 0.6 | 0.7 | 0.4 | 0.2 | 1.5 | 2.1 | 0.4 | 0.2 | 1.1 | 1.8 | 3.4 |
| Densometer, sec./100 cc | 20 | 28 | 19 | 27 | 28 | 22 | 5 | | 22 | 12 | 10 | 1 | 600 |
| Kerosene value, percent | 153 | 150 | 106 | 114 | 101 | 90 | 198 | 345 | 100 | 84 | 190 | 357 | 82 |
| Ash, percent | 43.2 | 60.1 | 45.6 | 61.1 | | 21.9 | 41.2 | 20.0 | 48.6 | | 39.7 | | 40.6 |
| Asbestos, percent | 49.9 | 69.4 | 52.8 | 70.7 | | 25.3 | 47.6 | 23.1 | 56.2 | | 45.8 | | 46.9 |

In each case the carbon and graphite filled papers were similar in strength, but those embodying carbon in a fibrous form were generally of increased bulk, porosity and kerosene saturation. All sheets drained fast and the retention of the powders as well as the fibers was nearly 100%.

The high carbon and graphite content asbestos papers of this invention are particularly useful in the manufacture of high resin content laminates or structures for transient thermal insulation applications. Their adaptability and effective resistance and properties to the rigorous conditions encountered in such high temperature applications are demonstrated by the following comparative tests.

EXAMPLE III

High graphite content asbestos papers composed of grade 3W or 4A chrysotile fiber, 3% by weight acrylic resin, and in some instances 1% by weight alum, with the balance the indicated proportions of graphite, were carefully hand saturated providing approximately 40% by weight of phenolic resin content throughout and laminated to a thickness of ¼ inch, then cured 1 hour at 300° F. under 400 p.s.i. Samples of a control paper to provide a standard for comparative evaluation, composed of 97% by weight of grade 3W chrysotile asbestos and 3% by weight of acrylic resin was likewise saturated with 40% by weight of phenolic resin and subjected to a like cure. Both the graphite containing and the asbestos control papers were then subjected to an oxy-acetylene torch test wherein the oxygen and acetylene pressure gauges were regulated to 40 p.s.i. and 10 p.s.i., respectively and the tip of a torch maintained at a distance of 1½ inches from the center of 6 x 6 x ¼ inch test samples of each paper. The time was recorded for the cold face temperature of the samples to reach 400° F. by locating a thermocouple on the cold side of the sample, and the time for the flame to burn completely through the sample was also recorded. The compositions of the control and the various asbestos and graphite containing asbestos fiber-resin laminate samples and their respective erosion rates were as follows:

ature of 6035° F. (average), test distance of 1⅛ inch, test angle of 45°, gas velocity of 1065 ft./sec., and test atmosphere composed of 80% $N_2$ and 20% $O_2$. The test samples were exposed for periods of 60 seconds and 90 seconds. The sample reinforcement composition and resulting data were as follows:

*Table IV.—Ablation test data*

| Sample | Paper Reinforcement Description | Resin (percent) | Sp. Gr. | 60 second Exposure Time (Avg. of 2 samples or single samp.) | | | | | 90 second Exposure Time (one sample) | | | | |
|---|---|---|---|---|---|---|---|---|---|---|---|---|---|
| | | | | Erosion Rate | | Mass Ablat. Rate (lb./ft.$^2$-sec.) | Eff. Heat Cap. (B.t.u./lb.) | Cold Face Temp. Rise (° F.) | Erosion Rate | | Mass Ablat. Rate (lb./ft.$^2$-sec) | Eff. Heat Cap. (B.t.u./lb.) | Cold Face Temp. Rise (° F.) |
| | | | | Mils/sec. | Gm./sec. | | | | Mils/sec. | Gm./sec. | | | |
| A | Carbon Cloth | 50 | 1.33 | 2.83 | 0.303 | 0.0196 | 20,400 | 208 | 2.73 | 0.273 | 0.0189 | 21,200 | 340 |
| B | ----do---- | 40 | 1.28 | 3.03 | 0.245 | 0.0202 | 19,700 | 673 | 2.92 | 0.206 | 0.0194 | 20,600 | 1,888 |
| C | Graphite Cloth | 48 | 1.29 | 3.06 | 0.235 | 0.0206 | 19,500 | 790 | 3.10 | 0.209 | 0.0208 | 19,200 | 1,603 |
| D | 75% Graphite Powder-Asbestos | 45 | 1.58 | 2.70 | 0.279 | 0.0222 | 18,000 | 169 | 3.03 | 0.281 | 0.0249 | 16,100 | 306 |
| E | 50% Graphite Fiber-Asbestos | 46 | 1.49 | 3.33 | 0.287 | 0.0258 | 15,500 | 67 | 3.42 | 0.283 | 0.0264 | 15,200 | 115 |
| F | 50% Chopped Textile Graphite Fiber-Asbestos | 50 | 1.40 | 3.68 | 0.291 | 0.0268 | 14,900 | 63 | 3.62 | 0.283 | 0.0264 | 15,200 | 112 |
| G | 50% Graphite Powder-Asbestos | 44 | 1.63 | 3.32 | 0.318 | 0.0281 | 14,300 | 92 | 3.23 | 0.280 | 0.0274 | 14,600 | 108 |
| H | 75% Graphite Fiber-Asbestos | 44 | 0.99 | 5.63 | 0.268 | 0.0290 | 13,800 | 870 | 5.55 | 0.233 | 0.0286 | 14,000 | 1,953 |
| I | 75% Carbon Powder-Asbestos | 42 | 1.35 | 4.82 | 0.257 | 0.0338 | 11,800 | 99 | 4.11 | 0.237 | 0.0288 | 13,900 | 140 |
| J | 75% Carbon Fiber-Asbestos | 44 | 0.86 | 6.33 | 0.259 | 0.0339 | 11,800 | 968 | 5.86 | 0.228 | 0.0314 | 12,700 | 1,992 |
| K | 50% Carbon Fiber-Asbestos | 44 | 1.18 | 5.73 | 0.349 | 0.0351 | 11,400 | 88 | 5.74 | 0.314 | 0.0352 | 11,400 | 845 |
| L | 50% Carbon Powder-Asbestos | 42 | 1.44 | 5.14 | 0.291 | 0.0384 | 10,500 | 95 | 5.60 | 0.286 | 0.0419 | 9,600 | -------- |

The high carbon filler content retention capacity, good physical properties and in particular porosity and high resin saturant capacity of these papers and in turn their effectiveness in laminations for high temperature ablative

*Table III*

| Resin Laminate Paper Reinforcement Compositions | | Thickness, in. | Time to 400° F. (sec.) | Time to Burn Through (sec.) | Erosion Rate,[1] mil/sec. | Insulation Index,[2] mil/sec. |
|---|---|---|---|---|---|---|
| Control: | | | | | | |
| Asbestos | 97% | 0.240 | 72 | 76 | 3.195 | 3.3 |
| Acrylic resin | 3% | | | | | |
| Asbestos | 48% | 0.297 | 68 | 120 | 2.48 | 4.37 |
| Graphite fiber | 48% | | | | | |
| Acrylic resin | 3% | | | | | |
| Alum | 1% | | | | | |
| Asbestos | 68% | 0.281 | 60 | 92 | 3.05 | 4.68 |
| Graphite fiber | 28% | | | | | |
| Acrylic resin | 3% | | | | | |
| Alum | 1% | | | | | |
| Asbestos | 48.5% | 0.255 | 60 | 104 | 2.45 | 4.25 |
| Graphite flake | 48.5% | | | | | |
| Acrylic resin | 3.0% | | | | | |
| Asbestos | 68% | 0.239 | 64 | 92 | 2.60 | 3.73 |
| Graphite flake | 29% | | | | | |
| Acrylic resin | 3% | | | | | |

[1] Erosion rate calculated by dividing sample thickness in mils by time for sample to burn through in seconds.
[2] Insulation index calculated by dividing the sample thickness in mils by time for the cold face to reach 400° F

EXAMPLE IV

A further series of resin laminates comprising reinforcement of products of this invention, and as a control resin laminate samples comprising carbon cloth or graphite cloth as the reinforcement were evaluated by a plasma arc torch test for a comparative determination of their high temperature and erosion properties. The graphite containing asbestos papers and the carbon or graphite cloth reinforced laminates contained approximately 40 to 50% by weight of phenolic resin. Samples cut to 2 inch x 2 inch x ½ inch were subjected to the high temperature of a 40 kw. Giannini Model L-40 Plasmatron powered by four selenium rectifiers. The following conditions were used on the test samples: heat flux of 400 B.t.u./ft.$^2$-sec., gas enthalphy of 2695 B.t.u./lb. (average), flame temperinsulations, among other advantageous attributes, are all demonstrated by the foregoing examples.

It is to be understood that the foregoing details are given for the purpose of illustration and not restriction and that variations within the spirit of this invention are to be included within the scope of the appended claims.

I claim:

1. A high bulk asbestos paper product consisting essentially of at least about 15% by weight of harsh asbestos fiber having a Schopper-Riegler freeness value of about 180 to 560 ml., approximately 2 to 10% by weight of resin size, and approximately 35 to 80% by weight of particulate carbon.

2. The paper product of claim 1 wherein the resin size is an acrylic resin.

3. The paper product of claim 2 wherein the particulate graphite comprises powdered flake graphite.

4. A high bulk asbestos paper consisting essentially of approximately 15 to 60% by weight of harsh asbestos fiber having a Schopper-Riegler freeness value of about 180 to 560% ml., approximately 2 to 10% by weight of resin size, and approximately 35 to 80% by weight of particulate carbon.

5. The paper product of claim 4 wherein the resin size is an acrylic resin.

6. The paper product of claim 5 wherein the particulate graphite comprises powdered flake graphite.

7. A high bulk asbestos paper consisting essentially of approximately 20 to 50% by weight of harsh asbestos fiber having a Schopper-Riegler freeness value of about 180 to 560 ml., approximately 3 to 6% by weight of resin size, and approximately 50 to 80% by weight of particulate carbon.

8. The paper product of claim 7 wherein the resin size is an acrylic resin and the particulate graphite comprises powdered flake graphite.

9. The paper product of claim 8 wherein the asbestos fiber is sized at least 70% by weight retained on 200 mesh standard screen sieve, and at least about 50% by weight of said fibers retained on 200 mesh standard screen sieve pass 28 mesh standard screen sieve and are retained on 100 mesh standard screen sieve.

10. A high bulk asbestos paper consisting essentially of about 22% by weight of harsh asbestos fiber having a Schopper-Riegler freeness value of about 180 to 560 ml., about 3% by weight of acrylic resin size, and about 75% by weight of powdered flake graphite.

11. The method of producing high bulk density asbestos paper containing major amounts of particulate graphite, said method comprising forming a dilute aqueous suspension consisting essentially of at least approximately 15% by weight of refined harsh asbestos fiber having a Schopper-Riegler freeness value of about 180 to 560 ml., approximately 2 to 10% by weight of resin size, and approximately 35 to 80% by weight of particulate graphite, then forming therefrom a water-laid sheet of paper.

12. The method of claim 11 wherein the resin size is an acrylic resin.

13. The method of claim 12 wherein the graphite comprises powdered graphite flakes.

14. The method of producing high bulk density asbestos fiber containing major amounts of particulate graphite, said method comprising forming a dilute aqueous suspension consisting essentially of approximately 15 to 60% by weight of refined harsh asbestos fiber having a Schopper-Riegler freeness value of about 350 to 560 ml., approximately 2 to 10% by weight of resin size, and approximately 35 to 80% by weight of particulate graphite, then forming therefrom a water-laid sheet of paper.

15. The method of claim 14 wherein the resin size is an acrylic resin.

16. The method of claim 15 wherein the graphite comprises powdered flake graphite.

17. The method of producing high bulk density asbestos paper containing major amounts of particulate graphite, said method comprising forming a dilute aqueous suspension consisting essentially of approximately 20 to 50% by weight of refined harsh asbestos fiber having a Schopper-Riegler freeness value of about 350 to 560 ml., approximately 3 to 6% by weight of resin size, and approximately 50 to 80% by weight of particulate graphite, then forming therefrom a water-laid sheet of paper.

18. The method of claim 17 wherein the resin size is an acrylic resin.

19. The method of claim 18 wherein the graphite comprises powdered flake graphite.

20. The method of claim 19 wherein the asbestos fiber is sized at least 70% by weight retained on 200 mesh standard screen sieve, and at least about 50% by weight of said fibers retained on 200 mesh standard screen sieve pass 28 mesh standard screen sieve and are retained on 100 mesh standard screen sieve.

References Cited by the Examiner
UNITED STATES PATENTS

| | | | |
|---|---|---|---|
| 2,485,458 | 10/1949 | Quinn | 162—155 |
| 3,022,213 | 2/1962 | Pattilloch | 162—181 |
| 3,034,981 | 5/1962 | Poelman | 162—155 |

DONALL H. SYLVESTER, *Primary Examiner.*

MORRIS O. WOLK, *Examiner.*

H. R. CAINE, *Assistant Examiner.*